US011453157B2

(12) United States Patent
Taraiya et al.

(10) Patent No.: US 11,453,157 B2
(45) Date of Patent: Sep. 27, 2022

(54) PROCESS FOR PRODUCING PIPE BY BIAXIAL ELONGATION

(71) Applicant: SABIC GLOBAL TECHNOLOGIES B.V., Bergen op Zoom (NL)

(72) Inventors: Ajay Kumar Taraiya, Geleen (NL); Maria Soliman, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 383 days.

(21) Appl. No.: 16/478,382

(22) PCT Filed: Jan. 22, 2018

(86) PCT No.: PCT/EP2018/051463
§ 371 (c)(1),
(2) Date: Jul. 16, 2019

(87) PCT Pub. No.: WO2018/138056
PCT Pub. Date: Aug. 2, 2018

(65) Prior Publication Data
US 2021/0299938 A1    Sep. 30, 2021

(30) Foreign Application Priority Data
Jan. 26, 2017    (EP) ..................... 17153248

(51) Int. Cl.
*B29C 55/26*    (2006.01)
*B29C 55/00*    (2006.01)
*B29K 23/00*    (2006.01)
*B29L 23/00*    (2006.01)

(52) U.S. Cl.
CPC ............ *B29C 55/26* (2013.01); *B29C 55/005* (2013.01); *B29K 2023/065* (2013.01); *B29K 2023/0625* (2013.01); *B29K 2023/0633* (2013.01); *B29K 2995/0063* (2013.01); *B29L 2023/22* (2013.01)

(58) Field of Classification Search
CPC .......... C08L 2205/02; C08L 2205/025; C08L 23/06; C08L 23/08; B29C 55/26; B29C 49/08; B29C 49/10; B29C 49/085; F16L 9/12; F16L 9/127; F16L 9/128; F16L 9/133; F16L 9/14
See application file for complete search history.

(56) References Cited

U.S. PATENT DOCUMENTS

| | | | | |
|---|---|---|---|---|
| 5,096,634 A | * | 3/1992 | Tsadares | B29C 55/26 264/409 |
| 5,338,589 A | * | 8/1994 | Bohm | C08L 23/06 428/36.9 |
| 5,650,114 A | * | 7/1997 | Ward | B29C 55/30 264/290.2 |
| 5,785,906 A | * | 7/1998 | Prenger | B29C 55/26 264/40.1 |
| 5,910,346 A | | 6/1999 | Ward et al. | |
| 5,948,332 A | * | 9/1999 | Prenger | B29C 48/09 264/40.5 |
| 6,325,959 B1 | * | 12/2001 | Ek | B29C 55/26 138/26 |
| 6,358,463 B1 | * | 3/2002 | Prevotat | B29C 55/26 264/532 |
| 6,447,710 B1 | * | 9/2002 | Prevotat | B29C 55/26 264/532 |
| 6,905,642 B2 | * | 6/2005 | Prevotat | B29C 55/26 264/40.7 |
| 7,037,977 B2 | * | 5/2006 | Miserque | F16L 9/12 525/191 |
| 7,230,054 B2 | * | 6/2007 | Mavridis | C08L 23/0815 525/240 |
| 7,390,455 B2 | * | 6/2008 | Prevotat | B29C 55/26 264/566 |
| 7,411,023 B2 | * | 8/2008 | Palmlof | C08L 23/06 525/191 |
| 2002/0022101 A1 | * | 2/2002 | Lenthe | B29C 48/903 428/36.9 |
| 2006/0275572 A1 | | 12/2006 | Bonnet et al. | |
| 2006/0281867 A1 | | 12/2006 | Jaker | |
| 2008/0312380 A1 | | 12/2008 | Kwalk et al. | |
| 2009/0036610 A1 | | 2/2009 | Jaker | |
| 2009/0246433 A1 | | 10/2009 | Michie | |
| 2012/0128912 A1 | | 5/2012 | Ek et al. | |

(Continued)

FOREIGN PATENT DOCUMENTS

| | | |
|---|---|---|
| CA | 2457430 C | 3/2003 |
| CN | 104277312 A | 1/2015 |

(Continued)

OTHER PUBLICATIONS

"PE 100 Pipe systems" Second edition, edited by Heiner Bromstrup (2004), pp. 16-44.
"PE 100 Pipe systems" Second edition, edited by Heiner Bromstrup (2004), pp. 51-62.
Alt, Frank P., et al., "Bimodal Polyethylene—Interplay of Catalyst and Process", Macromolecular Symposia (2001) 163, 135-143.
European Search Report; European Application No. 17153248.4; International Filing Date: Jan. 26, 2017; 4 pages.
International Search Report; International Application No. PCT/EP2018/051463; International Filing Date: Jan. 22, 2018; dated Mar. 19, 2018; 4 pages.

(Continued)

*Primary Examiner* — Jeffrey M Wollschlager
(74) *Attorney, Agent, or Firm* — Cantor Colburn LLP

(57) ABSTRACT

The invention relates to a process for producing a biaxially oriented pipe by a) forming a polyethylene composition into a tube, wherein the polyethylene composition comprises high density polyethylene (HDPE) and a second polyethylene selected from linear low density polyethylene (LLDPE), low density polyethylene (LDPE) and a combination of LLDPE and LDPE and b) stretching the tube of step a) in the axial direction and peripheral direction to obtain the biaxially oriented pipe.

16 Claims, 1 Drawing Sheet

(56) References Cited

U.S. PATENT DOCUMENTS

| | | | |
|---|---|---|---|
| 2015/0259519 A1* | 9/2015 | Wang | C08L 23/0815 |
| | | | 215/316 |
| 2016/0115264 A1 | 4/2016 | Rohatgi et al. | |
| 2017/0152376 A1 | 6/2017 | Liu et al. | |
| 2017/0166333 A1* | 6/2017 | Wang | B65B 7/28 |
| 2019/0359741 A1* | 11/2019 | Suchao-In | C08F 2/00 |
| 2020/0086548 A1 | 3/2020 | Taraiya et al. | |

FOREIGN PATENT DOCUMENTS

| | | | |
|---|---|---|---|
| JP | 0994867 A | | 4/1997 |
| JP | 2000343600 A | | 12/2000 |
| WO | WO9319924 | * | 10/1993 |
| WO | 2007003530 A1 | | 1/2007 |
| WO | 2014072056 A1 | | 5/2014 |
| WO | 2016005044 A1 | | 1/2016 |

OTHER PUBLICATIONS

Peacock, Andrew J., "Handbook of Polyethylene", Chapter 3 Production Processes, 2000, Marcel Dekker, Inc., New York; ISBN 0824795466; p. 43-66.

Written Opinion; International Application No. PCT/EP2018/051463; International Filing Date: Jan. 22, 2018; dated Mar. 19, 2018; 4 pages.

Alt et al.; "Bimodal Polyethylene—Interplay of Catalyst and Process"; Macromolecular Symposia; vol. 163, Issue 1; Jan. 2001; pp. 135-143.

Dow US "The Power of Plastic HDPE Replaces Carbon Steel in Safety-Related Pipe System at AmerenUE Nuclear Plant" Oct. 1, 2009. pp. 1-4.

* cited by examiner

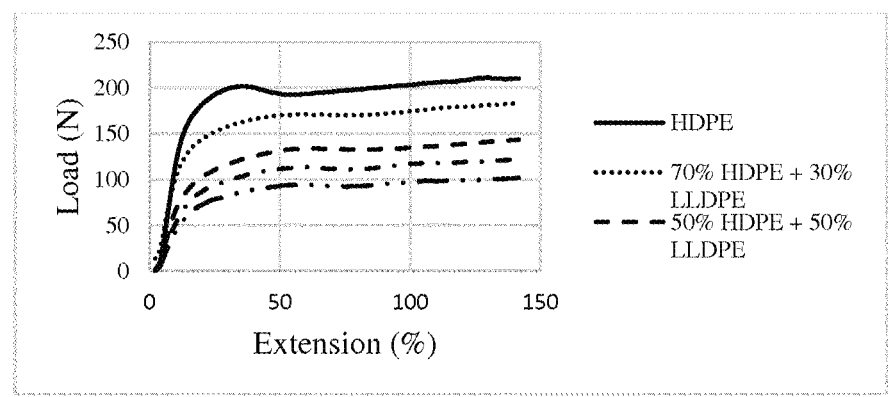
Tensile drawing at 115°C of HDPE (A6060R), LLDPE (6135BE) and their blends

PROCESS FOR PRODUCING PIPE BY BIAXIAL ELONGATION

CROSS REFERENCE TO RELATED APPLICATIONS

This application is a 371 of International Application No. PCT/EP2018/051463, filed Jan. 22, 2018, which is incorporated by reference in its entirety, and which claims priority to European Application No. 17153248.4, filed Jan. 26, 2017.

The present invention relates to process for a producing a pipe by a biaxial elongation of a polyethylene composition. The invention further relates to a pipe obtainable by such process.

It is known to improve the physical and mechanical properties of a polymer material by orienting the material. In many cases, orienting a material to improve a property in one direction leads to worsening of the same property in the direction perpendicular to the direction of orientation. In order to adapt the properties in both directions, a biaxial orientation of the material may be applied. The biaxial orientation means that the polymer material is oriented in two directions, perpendicular to one another. A pipe can be oriented in the axial direction and peripheral direction (hoop direction) to improve properties such as tensile strength.

Biaxially oriented PVC pipes with superior mechanical properties have been commercially produced. Biaxially oriented polyethylene pipes are also known. A process producing a pipe by a biaxial elongation of a polyethylene composition is known e.g. from U.S. Pat. No. 6,325,959. U.S. Pat. No. 6,325,959 discloses a method for manufacturing a polyolefin plastic pressurized pipe comprising:
   (a) forming the polyolefin plastic into a pipe;
   (b) partly cross-linking the polyolefin plastic;
   (c) orienting the polyolefin plastic biaxially in the axial and peripheral directions; and
   (d) additionally cross-linking the polyolefin plastic after the biaxial orientation.

U.S. Pat. No. 6,325,959 mentions that the most preferred polyolefin plastic is ethylene plastic, in particular ethylene plastic of the MDPE and HDPE type.

Upon solid-state drawing, semi-crystalline polymers such as polyethylene form a neck, unlike PVC. This neck has to be drawn out until a product with a uniform thickness is obtained. The degree of the drawing to achieve this is called its natural draw ratio. Typically the natural draw ratio is around 4-6 for HDPE.

Drawing at a high axial draw ratio leads to highly unbalanced pipe prone to splitting along the axial direction. Hence, a high natural draw ratio poses a problem for producing a biaxially oriented pipe with uniform thickness.

It is an object of the present invention to provide a process for producing a biaxially oriented pipe from a composition which has a low natural draw ratio, such that a uniform biaxially oriented pipe can be obtained.

Accordingly, the present invention provides a process for producing a biaxially oriented pipe by
   a) forming a polyethylene composition into a tube, wherein the polyethylene composition comprises high density polyethylene (HDPE) and a second polyethylene selected from linear low density polyethylene (LLDPE), low density polyethylene (LDPE) and a combination of LLDPE and LDPE and
   b) stretching the tube of step a) in the axial direction and peripheral direction to obtain the biaxially oriented pipe.

It was found that the blending of the second polyethylene to HDPE leads to suppression of necking, which allows uniform drawing with a low axial draw ratio.

Polyethylene Composition

The production processes of HDPE, LLDPE and LDPE are summarised in Handbook of Polyethylene by Andrew Peacock (2000; Dekker; ISBN 0824795466) at pages 43-66.

HDPE

HDPE may be an ethylene homopolymer or may comprise a comonomer, for example butene or hexene.

Preferably, the HDPE has a density of 940-960 kg/m$^3$, more preferably 940-955 kg/m$^3$, measured according to ISO1183.

Preferably, the HDPE has a Melt Flow Rate of 0.1-4 g/10 min, more preferably 0.1-1 g/10 min, measured according to ISO1133-1:2011 (190° C./5 kg).

In some embodiments, the composition comprises a compound comprising the HDPE and a colorant, wherein the compound has a density of 947-965 kg/m$^3$ measured according to ISO1183. The colorant may e.g. be carbon black or a pigment having a color of e.g. black, blue or orange. The amount of the colorant is typically 1-5 wt %, more typically 2-2.5 wt %, with respect to the compound comprising the HDPE and the colorant, the rest typically being the HDPE.

The HDPE may be unimodal, bimodal or multimodal. Preferably, the HDPE is bimodal or multimodal. Such HDPEs have properties suitable for producing a pipe.

The HDPE can be produced by using low pressure polymerisation processes. For example, pipe materials of the performance class PE 80 and PE 100 are known, which are generally produced in cascade plants by a so called bimodal or multimodal process. The production processes for bimodal HDPE are summarised at pages 16-20 of "PE 100 Pipe systems" (edited by Bromstrup; second edition, ISBN 3-8027-2728-2). Suitable low pressure processes are slurry cascade of stirred reactors, slurry cascade of loop reactors and a combination of different processes such as slurry loop gas phase reactor. It is also possible to use a multimodal polyethylene, preferably trimodal polyethylene, as described for example in WO2007003530, as high density polyethylene pipe material.

The performance classes PE 80 and PE 100 are discussed at pages 35-42 of "PE 100 Pipe systems" (edited by Bromstrup; second edition, ISBN 3-8027-2728-2). The quality test methods are described at pages 51-62 of "PE 100 Pipe systems".

The production of bimodal high density polyethylene (HDPE) via a low pressure slurry process is described by Alt et al. in "Bimodal polyethylene-Interplay of catalyst and process" (Macromol.Symp. 2001, 163, 135-143). In a two stage cascade process the reactors may be fed continuously with a mixture of monomers, hydrogen, catalyst/co-catalyst and hexane recycled from the process. In the reactors, polymerisation of ethylene occurs as an exothermic reaction at pressures in the range between for example 0.5 MPa (5 bar) and 1 MPa (10 bar) and at temperatures in the range between for example 75° C. and 85° C. The heat from the polymerisation reaction is removed by means of cooling water. The characteristics of the polyethylene are determined amongst others by the catalyst system and by the applied concentrations of catalyst, co monomer and hydrogen.

The concept of the two stage cascade process is elucidated at pages 137-138 by Alt et al. "Bimodal polyethylene-Interplay of catalyst and process" (Macromol.Symp. 2001, 163). The reactors are set up in cascade with different conditions in each reactor including low hydrogen content in the second reactor. This allows for the production of HDPE with a bimodal molecular mass distribution and defined co monomer content in the polyethylene chains.

Preferred examples of the HDPE include a unimodal or bimodal PE 80, a bimodal PE 100 and a multimodal HDPE resin. PE 80 is a PE material with an MRS (minimum required strength after 50 years for water at 20 degrees Celsius) of 8 MPa and PE 100 is a PE material with an MRS of 10 MPa. The pipe classification is elucidated at page 35 of "PE 100 Pipe systems" (edited by Bromstrup; second edition, ISBN 3-8027-2728-2).

Preferably, the HDPE or the compound comprising the HDPE and the colorant has one or more of, preferably all of, the following characteristics:

Tensile modulus of 500-1400 MPa, preferably 700-1200 MPa (according to ISO 527-2)

Yield stress of 15-32 MPa, preferably 18-28 MPa (according to ISO 527-2)

Full Notch Creep Test (FNCT): 100-20000 h (according to ISO 16770@80 degrees centigrade/4 MPa)

Charpy of 10-35° C.@23° C., preferably 14-30° C. (according to ISO 1 eA).

LLDPE

The technologies suitable for the LLDPE manufacture include gas-phase fluidized-bed polymerization, polymerization in solution, polymerization in a polymer melt under very high ethylene pressure, and slurry polymerization.

The LLDPE comprises ethylene and a C3-C10 alpha-olefin comonomer (ethylene-alpha olefin copolymer). Suitable alpha-olefin comonomers include 1-butene, 1-hexene, 4-methyl pentene and 1-octene. The preferred co monomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

Preferably, the LLDPE has a density of 900-948 kg/m$^3$, more preferably 915-935 kg/m$^3$, more preferably 920-935 kg/m$^3$, determined according to ISO1872-2.

Preferably, the LLDPE has a Melt Flow Rate of 0.1-3.0 g/10 min, more preferably 0.3-3.0 g/10 min, determined according to ISO1133-1:2011 (190° C./2.16 kg).

LDPE

The LDPE may be produced by use of autoclave high pressure technology and by tubular reactor technology.

LDPE may be an ethylene homopolymer or may comprise a comonomer, for example butene or hexene.

Preferably, the LDPE has a density of 916-940 kg/m$^3$, more preferably 920-935 kg/m$^3$, determined according to ISO1872-2.

Preferably, the LDPE has a Melt Flow Rate of 0.1-3.0 g/10 min, more preferably 0.3-3.0 g/10 min, determined according to ISO1133-1:2011 (190° C./2.16 kg).

Polyethylene Composition

The second polyethylene may be LLDPE, LDPE or a combination of LLDPE and LDPE. Preferably, the second polyethylene is LLDPE or a combination of LLDPE and LDPE. More preferably, the second polyethylene is LLDPE. In case the second polyethylene is a combination of LLDPE and LDPE, the weight ratio of LLDPE to LDPE may e.g. be at least 0.1, for example at least 0.2 or at least 0.3 and at most 10, for example at most 5 or at most 3. Preferably, the weight ratio of LLDPE to LDPE is at least 1, for example 2 to 10.

The polyethylene composition may be obtained by melt-mixing HDPE and the second polyethylene, optionally with any optional components.

Preferably, the weight ratio of HDPE to the second polyethylenein the polyethylene composition is more than 1, preferably 1.2-5, for example 1.5-4 or 2-3. This reduces fluctuation in the axial draw ratio along the length.

The polyethylene composition may comprise components other than HDPE and the second polyethylene, such as additives and fillers.

Examples of the additives include nucleating agents; stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; and/or components that enhance interfacial bonding between polymer and filler, such as a maleated polypropylene. The amount of the additives is typically 0 to 5 wt %, for example 1 to 3 wt %, with respect to the total composition.

Examples of fillers include glass fibers, talc, mica, nanoclay. The amount of fillers is typically 0 to 40 wt %, for example 5 to 30 wt % or 10 to 25 wt %, with respect to the total composition.

Accordingly, in some embodiments, the composition further comprises 0 to 5 wt % of additives and 0 to 40 wt % of fillers.

Preferably, the total amount of HDPE, the second polyethylene and the optional additives and the optional fillers is 100 wt % with respect to the total polyethylene composition.

In some embodiments—the total amount of HDPE and the second polyethylene with respect to the total amount of polymers present in the polyethylene composition is at least 95 wt %, at least 98 wt %, at least 99 wt % or 100 wt %.

In some embodiments—the total amount of HDPE and the second polyethylene with respect to the total polyethylene composition is at least 90 wt %, at least 95 wt %, at least 98 wt %, at least 99 wt % or 100 wt %.

Preferably, the polyethylene composition has a Melt Flow Rate of 0.1-4 g/10 min, more preferably 0.1-1 g/10 min, measured according to ISO1133-1:2011 (190° C./5 kg).

Process Steps

The polyethylene composition may be formed into a tube (step a) by any known method, such as extrusion or injection moulding. The biaxial elongation (step b) may be performed by any known method.

Methods for forming the polyethylene composition into a tube and the biaxial elongation of the tube are described in U.S. Pat. No. 6,325,959:

A conventional plant for extrusion of plastic pipes comprises an extruder, a nozzle, a calibrating device, cooling equipment, a pulling device, and a device for cutting or for coiling-up the pipe. By the molten mass of polymer on its way from the extruder through the nozzle and up to calibration, cooling and finished pipe being subjected to shear and elongation etc. in the axial direction of the pipe, an essentially uniaxial orientation of the pipe in its axial direction will be obtained. A further reason that contributes to the orientation of the polymer material in the direction of material flow is that the pipe can be subjected to tension in connection with the manufacture.

To achieve biaxial orientation, this plant can be supplemented, downstream of the pulling device, with a device for temperature control of the pipe to a temperature that is suitable for biaxial orientation of the pipe, an orienting device, a calibrating device, a cooling device, and a pulling device which supplies the biaxially oriented pipe to a cutting device or coiler.

The biaxial orientation can also be carried out in direct connection with the first calibration after extrusion, in which case the above-described supplementary equipment succeeds the first calibrating device.

The biaxial orientation of the pipe can be carried out in various ways, for instance mechanically by means of an internal mandrel, or by an internal pressurised fluid, such as air or water or the like. A further method is the orienting of the pipe by means of rollers, for instance by arranging the pipe on a mandrel and rotating the mandrel and the pipe relative to one or more pressure rollers engaging the pipe, or via internally arranged pressure rollers that are rotated relative to the pipe against an externally arranged mould or calibrating device.

Conditions for Step b)

Preferably, step b) is performed at a drawing temperature which is 1 to 30° C. lower than the melting point of the polyethylene composition, for example 2 to 20° C. or 3 to 10° C. lower than the melting point of the polyethylene composition. When more than one melting point can be measured for the polyethylene composition, the melting point of the polyethylene composition, step b) is preferably performed at a drawing temperature which is 1 to 30° C. lower than the highest melting point of the polyethylene composition, for example 2 to 20° C. or 3 to 10° C. lower than the highest melting point of the polyethylene composition.

In some embodiments, step b) may also be performed at a drawing temperature which is 1 to 30° C. lower than the melting point of the HDPE, for example 2 to 20° C. or 3 to 10° C. lower than the melting point of the HDPE.

In some embodiments, step b) is performed at a drawing temperature of 115-123° C.

Preferably, step b) is performed at an axial draw ratio of at most 5, more preferably at most 4, more preferably at most 3.

Preferably, step b) is performed at a hoop draw ratio of at most 2, more preferably at most 1.5.

The axial draw ratio of the drawn pipe is defined as the ratio of the cross-sectional area of the starting isotropic tube to that of the biaxially oriented pipe (i.e. product), that is, $$\lambda_{axial} = \frac{(Tube\ OD)^2 - (Tube\ ID)^2}{(Product\ OD)^2 - (Product\ ID)^2}$$

OD stands for outer diameter and ID stands for inner diameter.

In the case of expanded tube drawing, the hoop draw ratio of the product varies from the inner to the outer wall. These draw ratios are defined as:

$$\lambda_{hoop,inner} = \frac{Product\ ID}{Tube\ ID}$$

$$\lambda_{hoop,outer} = \frac{Product\ OD}{Tube\ OD}$$

The average hoop draw ratio can be defined as:

$$\lambda_{average\ hoop} = \frac{Total\ Draw\ Ratio\ \lambda_{Total}}{Axial\ Draw\ Ratio\ \lambda_{axial}}$$

Where $$\lambda_{Total} = \frac{Tube\ Wall\ Thickness}{Product\ Wall\ Thickness}$$

Biaxially Oriented Pipe

The invention also relates to the biaxially oriented pipe obtained or obtainable by the process according to the invention.

The biaxially oriented pipe according to the present invention may be a pressure pipe or a non-pressure pipe. The preferred pipe is a pressure pipe.

The biaxially oriented pipe may typically have a thickness of 0.3 mm to 10 cm. The biaxially oriented pipe may typically have an outer diameter of 2 mm to 2 mx mm. In some examples, the biaxially oriented pipe has an outer diameter of 2 mm to 1 cm and a thickness of 0.3 mm to 2 mm. In some examples, the biaxially oriented pipe has an outer diameter of 1 cm to 10 cm and a thickness of 1 mm to 3 mm. In some examples, the biaxially oriented pipe has an outer diameter of 10 cm to 50 cm and a thickness of 1 mm to 1 cm. In some examples, the biaxially oriented pipe has an outer diameter of 50 cm to 2 m and a thickness of 5 mm to 10 cm.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Materials:

HDPE: SABIC grade Vestolen A 6060R having a density of 959 kg/m³ (black compound density) and MFR 5 kg/190° C. of 0.3 g/10 minutes. Bimodal PE.

LLDPE: SABIC grade LLDPE 6135BE having a density of 932 kg/m³ and MFR 2.16 kg/190° C. of 0.8 g/10 minutes and MFR 5kg/190° C. of 2.4 g/10 minutes.

LLDPE: SABIC grade LLDPE 6335BE having a density of 935 kg/m³ and MFR 2.16 kg/190° C. of 2.8 g/10 minutes.

Procedure:

HDPE and LLDPE 6135BE were compounded using twin screw extruder at the weight ratio of 70/30, 50/50 and 30/70. Processing temperature and screw profile were of standard polyethylene compounding. Load-extension curves of these compositions are shown in FIG. 1, along with pure HDPE and pure LLDPE 6135BE.

FIG. 1 shows that the load-extension curve of pure HDPE has a relatively sharp peak, which indicates a neck with high natural draw ratio. Other samples do not show such behavior, indicating that necking is suppressed.

These compounded granules of blends were used to produce thick tubular profiles of approximate dimensions of outer diameter 30 mm and inner diameter 15 mm. These thick tubes were drawn over an expanding conical mandrel of exit diameter of 32 mm and semi angle 15 degree at temperature of 120° C. Tubes from the blend of HDPE/LLDPE (70/30) were drawn very uniformly in thickness and could be drawn to low axial draw ratio of 1.5 at slow drawing speed of 5 cm/minute.

Hoop tensile strength was measured for the produced pipes. The biaxial drawing increases the hoop tensile strength. It can be understood that the blend of HDPE/LLDPE (70/30) allows a stable manufacturing of a pipe where necking is suppressed, with a hoop tensile strength of the obtained pipe much higher than the non-drawn HDPE.

TABLE 1

| HDPE | LLDPE 6135BE | Axial Draw Ratio | Av. Hoop Draw Ratio | Hoop Tensile Strength (MPa) |
|---|---|---|---|---|
| 100 | 0 | 1 | 1 | 19.5 ± 1.2 |
| 100 | 0 | 3 | 1.4 | 28.5 ± 1.5 |
| 70 | 30 | 1 | 1 | 20 ± 1.5 |
| 70 | 30 | 3 | 1.4 | 25 ± 0.8 |
| 50 | 50 | 1 | 1 | 16.5 ± 1.6 |
| 50 | 50 | 3 | 1.4 | 20.6 ± 0.5 |

Production and Testing of Pipes

Preparation of Blends

HDPE and LLDPE 6335BE were compounded using twin screw extruder at the weight ratio of 70/30, 80/20 and 90/10. Processing temperature and screw profile were of standard polyethylene compounding.

Biaxially Oriented Pipes, Inventive Examples (Inv.)

The compounded granules of blends were used to produce pipes having an outer diameter of 32 mm and an average wall thickness of 3 mm. To obtain biaxially oriented pipes (Inventive examples=Inv., table 2), the pipes were drawn over an expanding conical mandrel of exit diameter of 32 mm and semi angle 15 degree at temperature of 120° C. Pipes from the blend of HDPE/LLDPE (70/30, 80/20 and 90/10) were drawn very uniformly in thickness and could be drawn to low axial draw ratio of 1.5 at slow drawing speed of 5 cm/minute.

Pipes, Comparative Examples (Comp.)

The compounded granules of blends were used to produce pipes having an outer diameter of 32 mm and an average wall thickness of 3 mm.

Testing

The resistance to internal pressure of pipes has been determined at different stress levels at 20° C. according to ISO 1167-1 on pipes (Inventive and comparative examples) having an outer diameter of 32 mm and an average wall thickness of 3 mm. The results are shown in Table 2.

TABLE 2

Results of pipe testing of HDPE/LLDPE blends.

| | HDPE wt % | LLDPE 6335BE wt % | Draw Ratio | Sigma16/ 20° C. [hours] | Sigma18/ 20° C. [hours] | Sigma20/ 20° C. [hours] |
|---|---|---|---|---|---|---|
| Comp. | 100 | 0 | 1 | 1.77 | | |
| Comp. | 90 | 10 | 1 | 0.92 | 0.18 | 0.05 |
| Comp. | 80 | 20 | 1 | 0.73 | 0.14 | 0.03 |
| Comp. | 70 | 30 | 1 | 0.38 | 0.08 | 0.01 |
| Inv. | 90 | 10 | 2.4 | >2500 | 417 | 25 |
| Inv. | 80 | 20 | 2.5 | >2500 | >2500 | 73 |
| Inv. | 70 | 30 | 2.5 | >2500 | >2500 | 33 |

It can be seen from the results presented in Table 2 that biaxially oriented pipes (Inventive samples=Inv.) of the said composition greatly outperformed the as melt extruded pipes (Comparative examples=Comp.) of the same composition.

The invention claimed is:

1. A process for producing a biaxially oriented pipe by
    a) forming a polyethylene composition into a tube, wherein the polyethylene composition comprises high density polyethylene (HDPE) and a second polyethylene comprising a linear low density polyethylene (LLDPE), wherein the LLDPE has a density of 932 to 948 kg/m³ and
    b) stretching the tube of step a) in the axial direction and peripheral direction to obtain the biaxially oriented pipe, wherein step b) is performed at an axial draw ratio of at most 5 and an average hoop draw ratio of 1.1 to 2.0; and
    wherein the obtained biaxially oriented pipe has an outer diameter and a thickness and wherein the outer diameter is 2 mm to 1 cm and the thickness is 0.3 mm to 2 mm, the outer diameter is 1 cm to 10 cm and the thickness is 1 mm to 3 mm, or the outer diameter is 10 cm to 50 cm and the thickness is 1 mm to 1 cm, or the outer diameter is 50 cm to 2 m and the thickness is 5 mm to 10 cm.

2. The process according to claim 1, wherein the HDPE has a density of 940-960 kg/m3 measured according to ISO1183 and/or a Melt Flow Rate of 0.1-4 g/10 min, measured according to ISO1133-1:2011 (190° C/5 kg).

3. The process according to claim 1, wherein the HDPE has a density of 940-955 kg/m³ measured according to ISO1183 and a Melt Flow Rate of 0.1-4 g/10 min measured according to ISO1133-1:2011 (190° C/5 kg).

4. The process according to claim 1, wherein the LLDPE has a Melt Flow Rate of 0.1-3.0 g/10 min, determined according to ISO1133-1:2011 (190° C/2.16 kg).

5. The process according to claim 1, wherein the second polyethylene further comprises a low density polyethylene (LDPE), wherein the LDPE has a Melt Flow Rate of 0.1-3.0 g/10 min, determined according to ISO1133-1:2011 (190° C/2.16 kg).

6. The process according to claim 1, wherein the second polyethylene further comprises a low density polyethylene (LDPE).

7. The process according to claim 1, wherein the weight ratio of HDPE to the second polyethylene in the polyethylene composition is more than 1.

8. The process according to claim 1,
    wherein the polyethylene composition has a Melt Flow Rate of 0.1 to 1 g/10 min, measured according to ISO1133-1:2011 (190° C/5 kg).

9. The process according to claim 1, wherein the total amount of HDPE and the second polyethylene with respect to the total polyethylene composition is at least 90 wt %.

10. The process according to claim 1, wherein the composition further comprises 0 to 5 wt % of additives and 0 to 40 wt % of fillers.

11. The process according to claim 1, wherein step b) is performed at a drawing temperature which is 1 to 30° C. lower than the melting point of the polyethylene composition.

12. The process according to claim 1, wherein step b) is performed at a drawing temperature of 115-123° C.

13. The process according to claim 1, wherein the HDPE has a density of 940-960 kg/m³ measured according to ISO1183 and a Melt Flow Rate of 0.1-1 g/10 min, measured according to ISO1133-1:2011 (190° C/5 kg);
  wherein the HDPE is bimodal or multimodal;
  wherein the LLDPE has a density of 932 to 935 kg/m³, determined according to ISO1872-2 and/or a Melt Flow Rate of 0.3-3.0 g/10 min, determined according to ISO1133-1:2011 (190° C/2.16 kg);
  wherein the second polyethylene further comprises a low density polyethylene (LDPE)
  wherein the LDPE has a density of 932 to 935 kg/m³ determined according to ISO1872-2 and/or a Melt Flow Rate of 0.1-3.0 g/10 min, determined according to ISO1133-1:2011 (190° C/2.16 kg);
  wherein the second polyethylene is LLDPE or a combination of LLDPE and LDPE;
  wherein the weight ratio of HDPE to the second polyethylene in the polyethylene composition is 1.2-5;
  wherein the total amount of HDPE and the second polyethylene with respect to the total polyethylene composition is at least 95 wt %; and
  wherein step b) is performed at an axial draw ratio of at most 4.

14. The process according to claim 13, wherein step b) is performed at a drawing temperature of 115-123° C.

15. The process according to claim 1, wherein the HDPE has a density of 940-955 kg/m³ measured according to ISO1183 and a Melt Flow Rate of 0.1-1 g/10 min, measured according to ISO1133-1:2011 (190° C/5 kg);
  wherein the LLDPE has a Melt Flow Rate of 0.3-3.0 g/10 min, determined according to ISO1133-1:2011 (190° C/2.16 kg); and
  wherein the second polyethylene further comprises a low density polyethylene (LDPE), wherein the LDPE has a Melt Flow Rate of 0.3-3.0 g/10 min, determined according to ISO1133-1:2011 (190° C/2.16 kg).

16. The process according to claim 1, wherein the weight ratio of HDPE to the second polyethylene in the polyethylene composition is 2:1 to 3:1.

* * * * *